(12) United States Patent
Imagawa et al.

(10) Patent No.: US 7,106,334 B2
(45) Date of Patent: Sep. 12, 2006

(54) ANIMATION CREATION PROGRAM

(75) Inventors: Hirotaka Imagawa, Tokyo (JP); Takeshi Ito, Tokyo (JP)

(73) Assignee: Sega Corporation, Tokyo (JP)

( * ) Notice: Subject to any disclaimer, the term of this patent is extended or adjusted under 35 U.S.C. 154(b) by 453 days.

(21) Appl. No.: 10/267,871

(22) Filed: Oct. 10, 2002

(65) Prior Publication Data
US 2003/0034980 A1 Feb. 20, 2003

Related U.S. Application Data

(63) Continuation of application No. PCT/JP02/01206, filed on Feb. 13, 2002.

(30) Foreign Application Priority Data

Feb. 13, 2001 (JP) ............................. 2001-036177
Aug. 14, 2001 (JP) ............................. 2001-246284

(51) Int. Cl.
*G06T 15/70* (2006.01)
(52) U.S. Cl. ....................................................... 345/474
(58) Field of Classification Search .................. 345/474
See application file for complete search history.

(56) References Cited

U.S. PATENT DOCUMENTS

| | | | |
|---|---|---|---|
| 4,600,919 A | | 7/1986 | Stern |
| 5,586,224 A | * | 12/1996 | Kunii et al. ................. 700/260 |
| 5,594,856 A | * | 1/1997 | Girard ......................... 345/473 |
| 5,623,428 A | * | 4/1997 | Kunii et al. ................. 345/473 |
| 5,625,577 A | | 4/1997 | Kunii et al. |
| 5,889,532 A | * | 3/1999 | Boucher et al. ............ 345/473 |

(Continued)

FOREIGN PATENT DOCUMENTS

EP 0 241 071 A1 10/1987

(Continued)

OTHER PUBLICATIONS

Nakamura et al. Inverse Kinematic Solutions With Singularity Robustness for Robot Manipulator Control. Journal of Dynamic Systems, Measurement and Control. Sep. 1986. vol. 108. pp. 163-171.*

(Continued)

*Primary Examiner*—Kee M. Tung
*Assistant Examiner*—Peter-Anthony Pappas
(74) *Attorney, Agent, or Firm*—Dickstein Shapiro LLP

(57) ABSTRACT

The present invention provides an animation creation program whereby the posture of a structure comprising a plurality of links can be determined by means of a simpler and easer operation. In accordance with the movement of one link in the structure comprising a plurality of links, the animation creation program of the present invention automatically determines the spatial positions of the other links of the structure so that the structure retains a posture that is as natural as possible. The animation creation program of the present invention uses, for example, inverse kinematics computation that is a computation method for controlling a human-type robot (humanoid) and is based on a matrix known as a Jacobian and the inverse matrix thereof which is known as the Singularity-Robust Inverse (SR-Inverse). By using this computation method in an animation creation program, in the creation of an animation of a structure comprising a plurality of links, it is possible, when moving one link of a structure displayed on a screen, to automatically determine the positions of the other links of the structure so that the posture of the structure as a whole does not become unnatural, and to create an animation of the structure comprising a plurality of links by means of a simpler and easer operation.

9 Claims, 19 Drawing Sheets

U.S. PATENT DOCUMENTS

| | | | |
|---|---|---|---|
| 5,982,389 A * | 11/1999 | Guenter et al. | 345/474 |
| 6,057,859 A * | 5/2000 | Handelman et al. | 345/474 |
| 6,088,042 A | 7/2000 | Handelman et al. | |
| 6,104,412 A | 8/2000 | Tsutsuguchi et al. | |
| 6,118,459 A * | 9/2000 | Hunter | 345/474 |
| 6,144,385 A | 11/2000 | Girard | |
| 6,191,798 B1 * | 2/2001 | Handelman et al. | 345/473 |
| 6,320,988 B1 * | 11/2001 | Yamaguchi et al. | 382/276 |
| 2003/0034979 A1 * | 2/2003 | Nakamura et al. | 345/474 |
| 2003/0122831 A1 * | 7/2003 | Jeong et al. | 345/473 |

FOREIGN PATENT DOCUMENTS

| | | |
|---|---|---|
| EP | 0 715 453 A2 | 6/1996 |
| JP | 7-141141 | 6/1995 |
| JP | 10-208072 | 8/1998 |
| JP | 10-340354 | 12/1998 |
| JP | 11-224351 | 8/1999 |
| JP | 2001-306599 | 11/2001 |
| WO | WO 97/40471 | 10/1997 |

OTHER PUBLICATIONS

Girard et al., Computational Modeling for the Computer Animation of Legged Figures, Computer Graphics Research Group, The Ohio State University, SIGGRAPH '85, vol. 19, No. 3, 1985.

* cited by examiner

FIG. 3
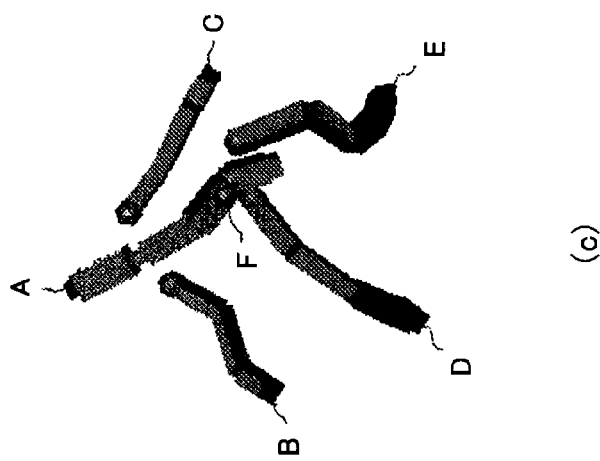
(c)
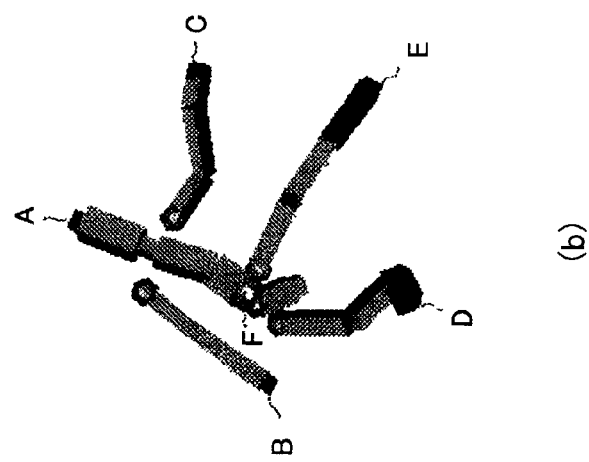
(b)
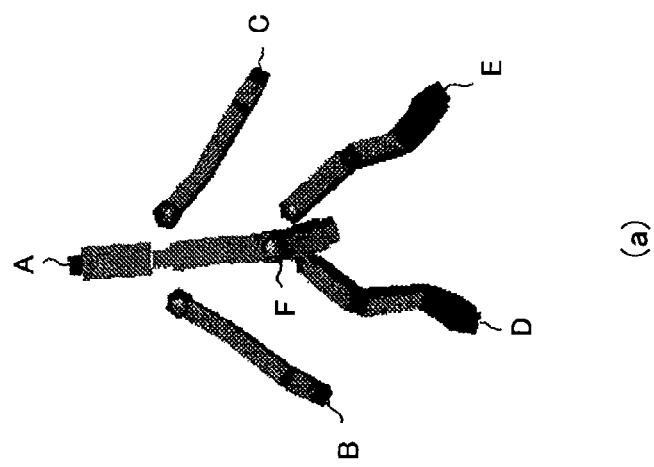
(a)

FIG. 6
(a)
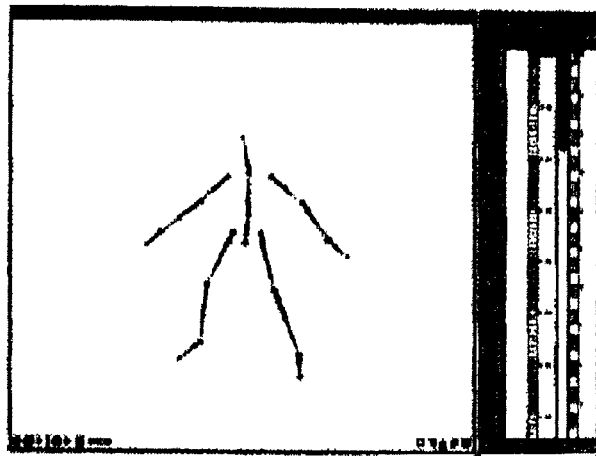
(b)
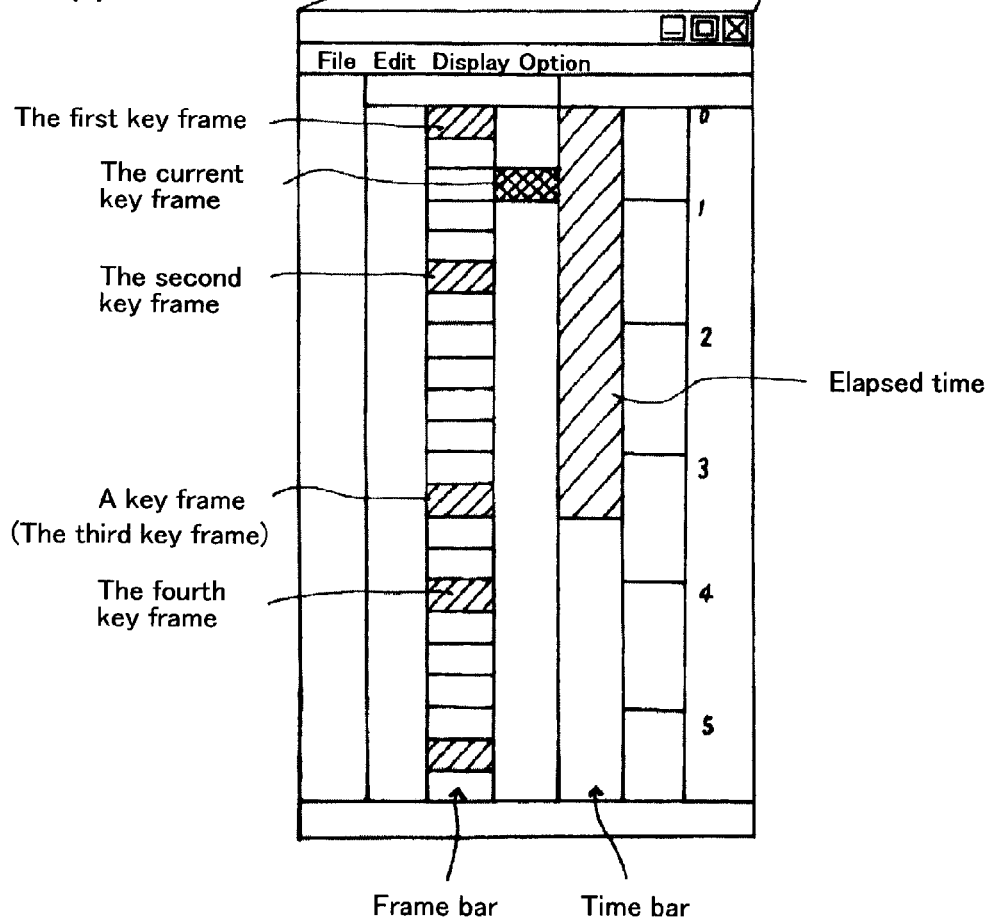

ANIMATION CREATION PROGRAM

This application is a continuation of international application number PCT/JP02/01206 filed Feb. 13, 2002, (pending).

TECHNICAL FIELD

The present invention relates to a computer readable medium for storing an animation creation program that uses three-dimensional computer graphics, and more particularly to a computer readable medium for storing an animation creation program for displaying a structure comprising a plurality of links formed in a three-dimensional space and for creating an animation (moving image) of this structure.

BACKGROUND ART

Generally, in the field of the creation of two-dimensional cell animations, the creation of the motion of a character is divided into "original images" and "moving images". An "original image" is a picture in which a pose that determines the motion as a whole is drawn, and a "moving image" is a picture produced by interpolation between one "original image" and another.

Meanwhile, three-dimensional computer graphics are now widely used as another method for modeling. In three-dimensional computer graphics images, after the creation of data known as "key frames", data between key frames is created automatically by means of spline interpolation and the like. When a "key frame" is regarded as an "original image" in the cell animation, it is said that working methods which are adopted in both cases are highly analogous.

However, as matters now stand, three-dimensional computer graphics modeling has not yet reached the expressive capacity of two-dimensional cell animation. The primary reason is said to be found in the work operation which is presented by way of example hereinbelow.

For example, in the creation of the motion of a human-type model, in three-dimensional computer graphics, progress is being made in the shape creation of human-type models in three dimensions, but as to the method for bringing movement to each of the parts of the human-type model, such as the hands and feet and head thereof, as matters now stand, in a broad classification, only motion capture and methods for the computational processing of 3-D rotational data are employed. Motion capture only provides the motion of a real person, and therefore sometimes limits the free expression of the animator. Further, the human-type model is a structure comprising a multiplicity of links and therefore possesses complexity and a large degree of freedom. The links are structural units having a joint section constituting a center of rotation, and a long section that extends from the joint section. The links can also be constituted by the joint section alone.

FIG. 19 shows an example of a simple human-type model that is constituted by a plurality of links. In FIG. 19, the joint section 11 of each link 10 is shown as a circular section, and the long section 12 extending from the joint section 11 is shown as a linear section. There have been problems in controlling the motion of such a human-type model by means of conventional computational processing methods (the simple inverse kinematics method, for example). For example, with an animation creation program that uses the conventional inverse kinematics method, it is not possible, when one link is moved, to automatically determine the positions of the other links so that the human-type model retains a posture that is as natural as possible. More precisely, a conventional animation creation program presets the joint sections for all the links to be either movable or fixed. Then, there has been the inconvenience that, when any one link is selected and the position of this link is moved (or rotated), the positions of the other movable links move upon exceeding the rotational range of the joint sections thereof, whereas the positions of the joint sections which are fixed do not move, which makes the posture of the human-type model unnatural, and that a selected link cannot move to the desired position because the other links are fixed. In this case, the animator was required to perform an operation to cancel the fixation of every one of the joint sections, and, in order to create a posture for the human-type model, to create the desired posture by moving each of the links. Consequently, the operation of a conventional animation creation program was complicated and inefficient, and the program was difficult for the animator to use.

DISCLOSURE OF THE INVENTION

Accordingly, it is an object of the present invention to provide a computer readable medium for storing an animation creation program whereby the posture of a structure comprising a plurality of links can be determined by means of a simpler operation.

It is another object of the present invention to provide a computer readable medium for storing an animation creation program constituted such that, in accordance with the movement of a given link, the structure comprising a plurality of links retains a posture that is as natural as possible.

In order to achieve the above objects, the present invention provides an animation creation program that determines the positions of the other links of the structure in accordance with the movement of a given link so that the structure comprising a plurality of links retains a posture that is as natural as possible.

For example, the animation creation program of the present invention uses inverse kinematics computation that is a computation method for controlling a human-type robot (humanoid) and based on a matrix known as a Jacobian and the inverse matrix thereof which is known as the Singularity-Robust Inverse (SR-Inverse). By using this computation method in an animation creation program, in the creation of an animation of a structure comprising a plurality of links, it is possible, when moving one link of a structure displayed on a screen, to automatically determine the positions of the other links of the structure so that the posture of the structure as a whole does not become unnatural, and to create an animation of the structure comprising a plurality of links by means of a simpler and easer operation.

BRIEF DESCRIPTION OF THE DRAWINGS

FIG. 3 serves to illustrate an example of a postural change of the structure according to the present embodiment;

FIG. 6 serves to illustrate a time sheet according to the embodiment of the present invention;

BEST MODE FOR CARRYING OUT THE INVENTION

An embodiment of the present invention will be described hereinbelow. However, the technical scope of the present invention is not limited to or by this embodiment.

Figure 1:
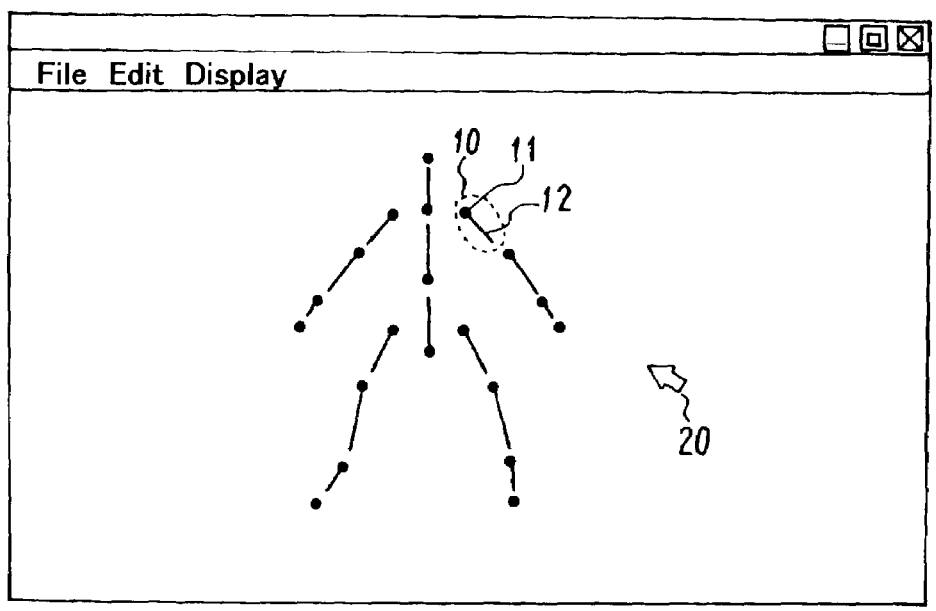
FIG. 1 is an example of a screen displaying a structure comprising a plurality of links.

FIG. 1 is an example of a screen displaying a structure comprising a plurality of links. The screen of FIG. 1 is, for example, the screen of a computer that runs the animation creation program according to the present embodiment. A human-type structure comprising a plurality of links formed in a predetermined three-dimensional space is displayed on this screen. As shown in the figure, a link 10 is constituted by a joint section (circular section) 11, and a long section (linear section) 12 that extends from the joint section 11. Although not illustrated, the linear section has a predetermined width. The link 10 can also be constituted by the joint section 11 alone. The joint section is a center of rotation corresponding to a human or animal joint. Furthermore, the rotational range (angle) of a joint section can be preset and changed by the user. The structure in FIG. 1 is a human-type model but so long as the structure is an object comprising a plurality of links (an animal, power shovel, and the like), the structure is not limited to being a human-type structure.

The user is able to select an arbitrary link by manipulating a mouse or the like to align a cursor (indicating means) 20 with a link of the structure being displayed. In the present embodiment, more particularly, a link can be selected simply by aligning the cursor with this link, without employing a predetermined link selection operation such as an operation in which the mouse is manipulated so as to align the cursor with a desired link, a menu is displayed by means of a left click operation or a right click operation, and "Select" in this menu is designated. The user can therefore select a link more easily. Further, according to the present embodiment, aligning the cursor with an arbitrary link changes the color of this link. The user is thus able to identify the selected link.

Figure 2:
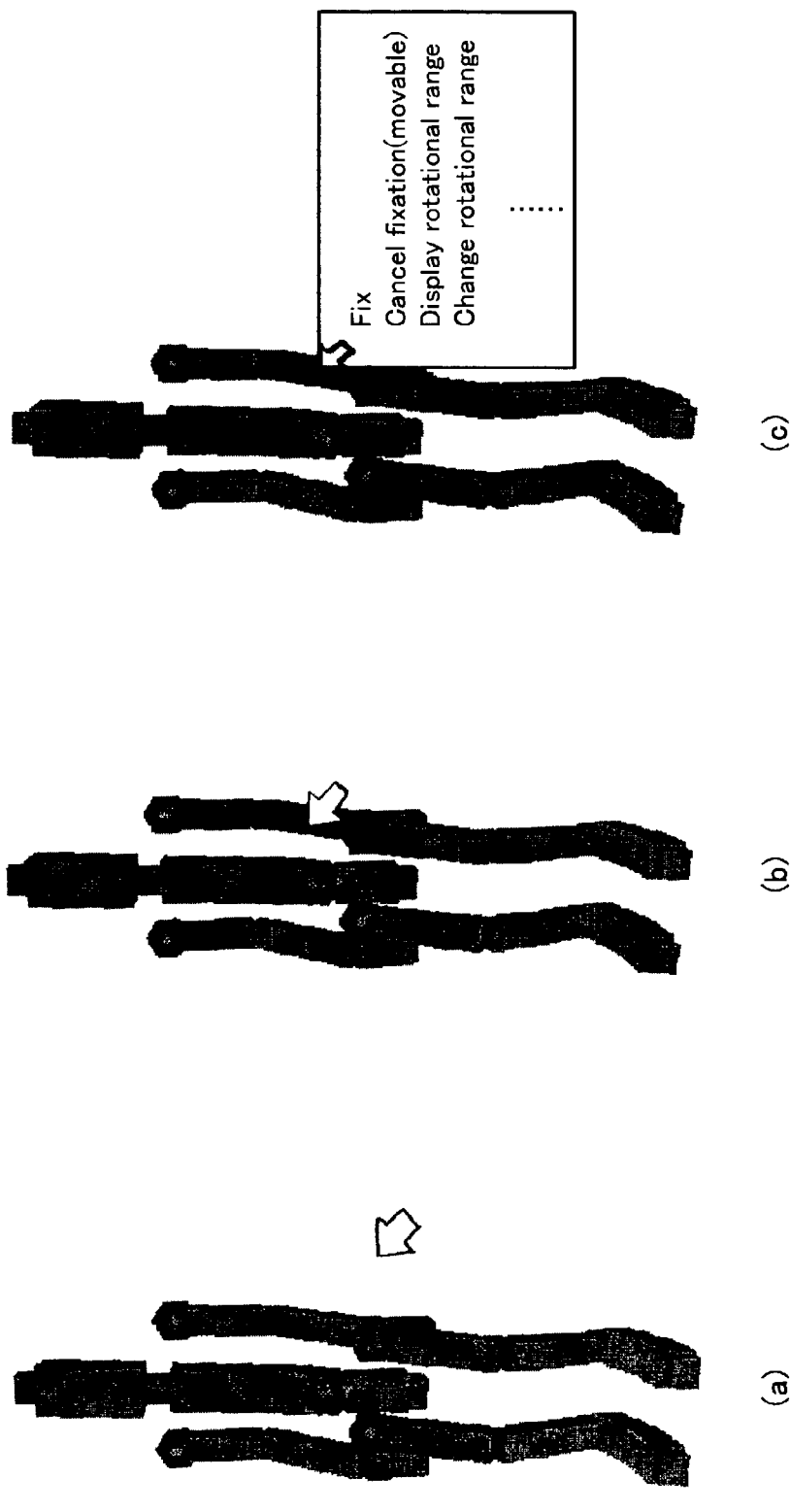
FIG. 2 serves to illustrate a change in the color of a selected link.

FIG. 2 serves to illustrate a change in the color of a selected link. As shown in FIGS. 2(*a*) to FIG. 2(*b*), moving the cursor such that same is aligned with an arbitrary link changes the color of this link.

The user is able to set the spatial position of the joint section of a selected link as movable or fixed. For example, as shown in FIG. 2(*c*), after aligning the cursor with an arbitrary link to thereby select this link, the joint section of the selected link can be set as fixed by right-clicking and selecting "Fix", which is contained in the menu thus displayed. Further, when the initial setting is fixed and there is a desire to change this setting from fixed to movable, "Cancel fixation" can be selected. Preferably, the display colors for the joint sections are preferably made different in accordance with the settings thereof in order to distinguish whether the setting of a joint section is fixed or movable.

The user manipulates the posture of the structure by dragging a selected link with the mouse to move and rotate the link on the screen. At such time, the joint sections of the links which are set as movable are movable in accordance with the movement of the link being dragged, and, in accordance with the movement and rotation of the link being dragged, the joint sections of the links which are set as fixed are within a range in which the posture of the structure does not become unnatural and do not move.

Further, in accordance with the movement of the selected link, the other links are in a range in which the structure retains a natural posture and do not rotate to exceed a rotational range.

The animation creation program according to the present embodiment thus determines the positions of the other links in accordance with the movement and rotation of the link which is being dragged, so that the posture of the structure is then as natural as possible.

For this purpose, the animation creation program according to the present embodiment uses, as one example, inverse kinematics computation that is based on a matrix known as a Jacobian and the inverse matrix thereof which is known as the Singularity-Robust Inverse (SR-Inverse) (referred to hereinafter as "inverse kinematics computation based on a Jacobian and the SR-Inverse thereof"). The inverse kinematics computation based on a Jacobian and the SR-Inverse thereof is a computation method that was developed to control human-type robots (humanoids), and, by using this computation method in an animation creation program, it is possible, when moving one link of a structure displayed on a screen, to determine the positions of the other links of the structure so that the posture of the structure as a whole does not become unnatural.

In the inverse kinematics computation based on a Jacobian and the SR-Inverse thereof, when the user wishes to change the posture of the structure by selecting a given link and moving this selected link, the following three conditions may be considered when determining the posture of the structure.

(1) When links other than the selected link are set as fixed, the posture of the structure is changed while the positions of the other links remain fixed. The number and arrangement of the fixed links is optional.

(2) The links do not rotate to exceed a preset rotational range (angle).

(3) The posture is determined such that the angles of the links are as close as possible to respective target values (ideal values).

The above conditions sometimes conflict with one another, such that there are cases where a solution cannot be found or divergence occurs, and so forth by means of the computational method. However, by using the above-mentioned computational method according to the present embodiment to control the posture of the structure to approach an ideal state, it is possible to continually obtain a stable solution also with respect to the above conditions. With the above-mentioned computational method as used in the present embodiment, setting to turn each condition ON and OFF as well as to set the importance of each condition can be performed for every link such that, even if conflicting conditions are imposed, the degree of implementation is automatically adjusted in accordance with importance, and a stable solution can be found in which the structure adopts a posture that is as natural as possible. Consequently, there may be cases where fixed joint sections move, or links rotate to exceed the rotational range thereof.

As a result of using such a computational method in the animation creation method, by means of a single operation by the user, such as one of moving a single arbitrary link, it is possible to determine a natural posture for the structure as a whole such that this link is disposed in the position designated. Consequently, it is possible to manipulate the posture of the structure extremely simply and intuitively in comparison with conventional manipulation to determine the posture of the structure as a whole while moving the links one by one.

More detailed methods for the inverse kinematics computation based on a Jacobian and the SR-Inverse are described in detail in the following documents, for example:

Nakamura, Y. and Hanafusa, H.: Inverse Kinematics Solutions with Singularity Robustness for Robot Manipulator Control, Journal of Dynamic Systems, Measurement, and Control, vol. 108, pp. 163 to 171 (1986)

Nagasaka, Inaba, Inoue: Systemic behavioral design of humanoid robots using kinematic motion conversion filter groups, Proceedings of the 17th Annual Conference of the Robotics Society of Japan, vol. 3, pp. 1207 to 1208 (1999), DasGupta, A. and Nakamura, Y: Making Feasible Walking Motion of Humanoid Robots from Human Motion Captured Data, Proceedings of International Conference on Robotics and Automation, pp. 1044 to 1049 (1999), Popovic, Z: Editing Dynamic properties of Captured Human Motion, Proceedings of IEEE international Conference on Robotics and Automation, pp. 670 to 675 (2000), Nakamura, Yamane, Nagashima: Dynamics computation of structure varying kinematic chains and its application to human figures, Journal of the Robotics Society of Japan, vol. 16, no. 8, pp. 124 to 131 (1998), Nakamura, Yamane, Nagashima: Dynamics of kinematic chains whose constraint conditions vary discontinuously—Application to human figures moving in the course of contact with their environment, Journal of the Robotics Society of Japan, vol. 18, no. 3, pp. 435 to 443 (2000).

FIG. 3 serves to illustrate an example of a postural change of the structure according to the present embodiment. In the example in FIG. 3, of the plurality of links that constitute the human-type structure, the links A, B, C, D, and E, which constitute the extremities (the head, hands and feet), are fixed links. Also, in FIG. 3, the link F, which corresponds to the waist section, is also a fixed link. According to the embodiment of the present invention, even if a link is set as fixed, this set link can be dragged and moved by being selected.

Therefore, when a link that is to be dragged (to be moved) is set as fixed, this fixed link can be dragged without performing an operation to change the setting for this link to movable temporarily as was the case conventionally, whereby operation can be simplified. Further, the setting for a link which is set as fixed remains fixed after the link is dragged, and such a link is handled as a fixed link when another link is dragged. Naturally, a link that is not fixed (a link that is set as movable) can also be dragged freely through selection of this link.

In FIG. 3(a), when, for example, the link F, which is the waist section of the human-type structure, is selected, and the joint section of this link is dragged in the lateral direction of the screen (an illustration of the window frame is omitted) as shown in FIG. 3(b), the position of each link is determined so as to retain a posture for the structure as a whole that is as natural as possible, by means of the algorithm of the animation creation program of the present embodiment. For example, the positions of the joint sections of the hands and feet links B, C, D, and E on the screen do not change and do not move, but the position of the head link A moves despite being set as fixed.

Further, as shown in FIG. 3(c), also when dragging in the rightward direction of the screen, similarly to the case in FIG. 3(b), the positions of the joint sections of the hands and feet links B, C, D, and E do not change and do not move, but the position of the head link A moves despite being set as fixed.

Thus, there are cases where, in accordance with the movement of a selected link, the animation creation program of the present embodiment displays the positions of links other than the selected link such that these positions move even when such links are fixed.

Figure 4:
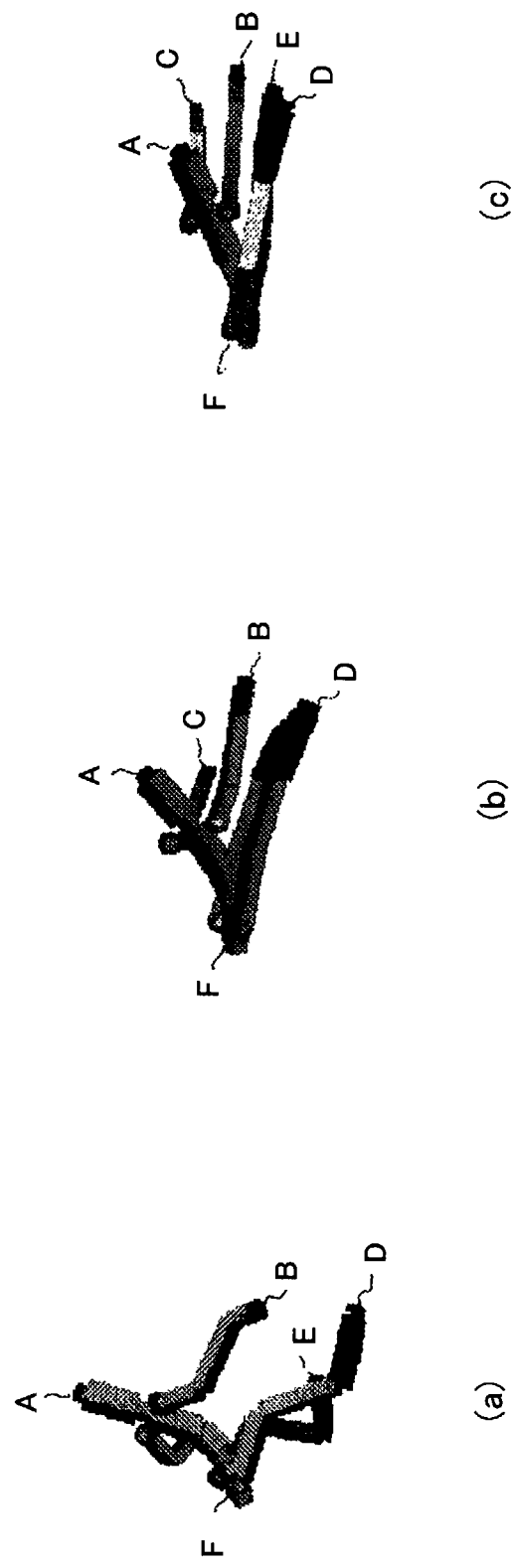
FIG. 4 serves to illustrate another example of a postural change of the structure according to the present embodiment.

FIG. 4 serves to illustrate another example of a postural change of the structure according to the present embodiment. In the example of FIG. 4, dragging the waist link F causes all the links including the other set links A, B, C, D, and E to move in the order of FIGS. 4(a), 4(b) and 4(c).

Furthermore, according to the present embodiment, by aligning the cursor with an arbitrary link to thereby select this link, and then right-clicking and selecting "Display rotational range" (See FIG. 2(c)) contained in the menu thus displayed, it is possible to display the rotational range of the selected link.

Figure 5:
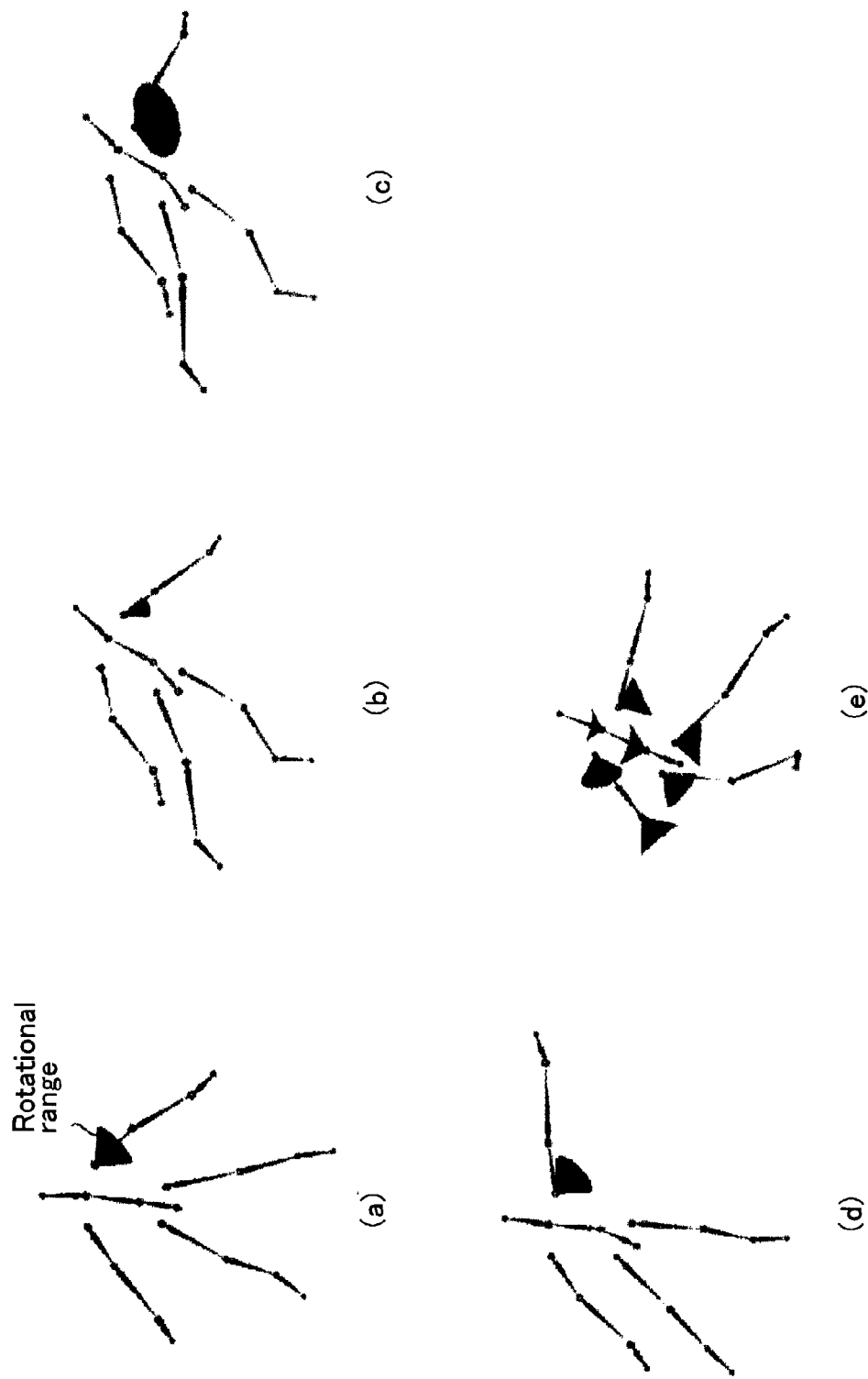
FIG. 5 shows an example of a screen displaying the rotational ranges of links.

FIG. 5 shows an example of a screen displaying the rotational ranges of the links. FIG. 5(a) is an example in which the rotational range of one link is displayed. The range of this rotational range can be changed by means of an operation by the user. For example, by selecting a link, and then selecting "Change rotational range" (See FIG. 2(c)) from the right click menu and dragging the fan-shaped (or elliptical) section that indicates the rotational range, it is possible to reduce the rotational range as shown in FIG. 5(b), or extend the rotational range as shown in FIG. 5(c).

Furthermore, as shown in FIG. 5(d), according to the animation creation program of the present embodiment, links can also exceed the present rotational range. In other words, there are cases where, when a selected link is dragged, since the positions of the other links are determined so that the structure as a whole retains a posture that is as natural as possible, the animation creation program of the present embodiment displays the positions of links so as to rotate to exceed the preset rotational range.

Also, in cases where a link exceeds the rotational range thereof, and so forth, when the link is dragged and rotated such that the link is positioned at the limit of the rotational range thereof or so as to lie just within or outside this limit, the color of the rotational range can also be made to change.

Moreover, as shown in FIG. 5(e), the number of links which display the rotational range is not limited to one. Rather, the rotational range of an optional plurality of links can also be displayed simultaneously.

In addition to the window for displaying the structure described above, an animation time sheet window is displayed in the screen.

FIG. 6 serves to illustrate the time sheet according to the embodiment of the present invention. FIG. 6(a) is an outline view of the time sheet window screen that is displayed alongside the window screen displaying the structure shown in FIG. 1, and FIG. 6(b) is an enlarged view of this window screen. According to the present embodiment, the time sheet is displayed with the time axis lying in a vertical direction. Accordingly, the position of each frame corresponding to time in the frame bar, and the elapsed time of the whole animation in the time bar, and the like, are displayed in a vertical direction. More preferably, the positions of key frames, and the position of the frame being displayed in the current screen can also be displayed.

The animation of the structure is created by means of the following operation. First, in the frame of the current screen, the posture of the structure in FIG. 3(a) is created, and established as the first key frame, for example. Thereafter, a frame that follows this frame by a predetermined number of frames is selected as the current screen, and, in this screen, the posture of the structure in FIG. 3(b) is created, and established as the second key frame. In addition, a frame that follows this frame by a predetermined number of frames is selected as the current screen, and, in this screen, the posture of the structure in FIG. 3(a) is recreated and established as the third key frame. Then, in addition, a frame that follows this frame by a predetermined number of frames is selected as the current screen, and, in this screen, the posture of the structure in FIG. 3(c) is created, and established as the fourth key frame. After creating the key frames in this manner, the frame images between the key frames are created by performing a predetermined interpolation processing operation. It is thus possible to create an animation of smooth motion in which the waist of the structure is caused to move laterally.

The time sheet was displayed by a conventional animation creation program such that the time axis of the time sheet lay in a horizontal direction. However, according to the present embodiment, the time sheet is disposed in vertical form. Consequently, it is possible to image the flow of a cut in the same way that a film is fed vertically in a conventional movie or similar, and to provide an interface that is also easy for the maker of a conventional two-dimensional cell animation to understand.

The animation creation program of the present invention is not limited to an animation creation program that uses the inverse kinematics computation based on a Jacobian and the SR-Inverse thereof which was described in the embodiment above, but rather can also be a program that comprises a computation method (algorithm) permitting the link positions of the structure to be automatically determined so that the structure retains a posture that is as natural as possible.

(Additional Embodiment)

An additional embodiment of the present invention will also be described. The animation creation program of the present embodiment comprises a function for displaying, in the window screen that displays a structure corresponding to the key frame of the current time, a structure that corresponds to the frame of another time as a ghost image. The structure of another time is displayed by means of a ghost display so as to be paler in color and/or of a higher transparency than the structure of the current time.

Figure 7:
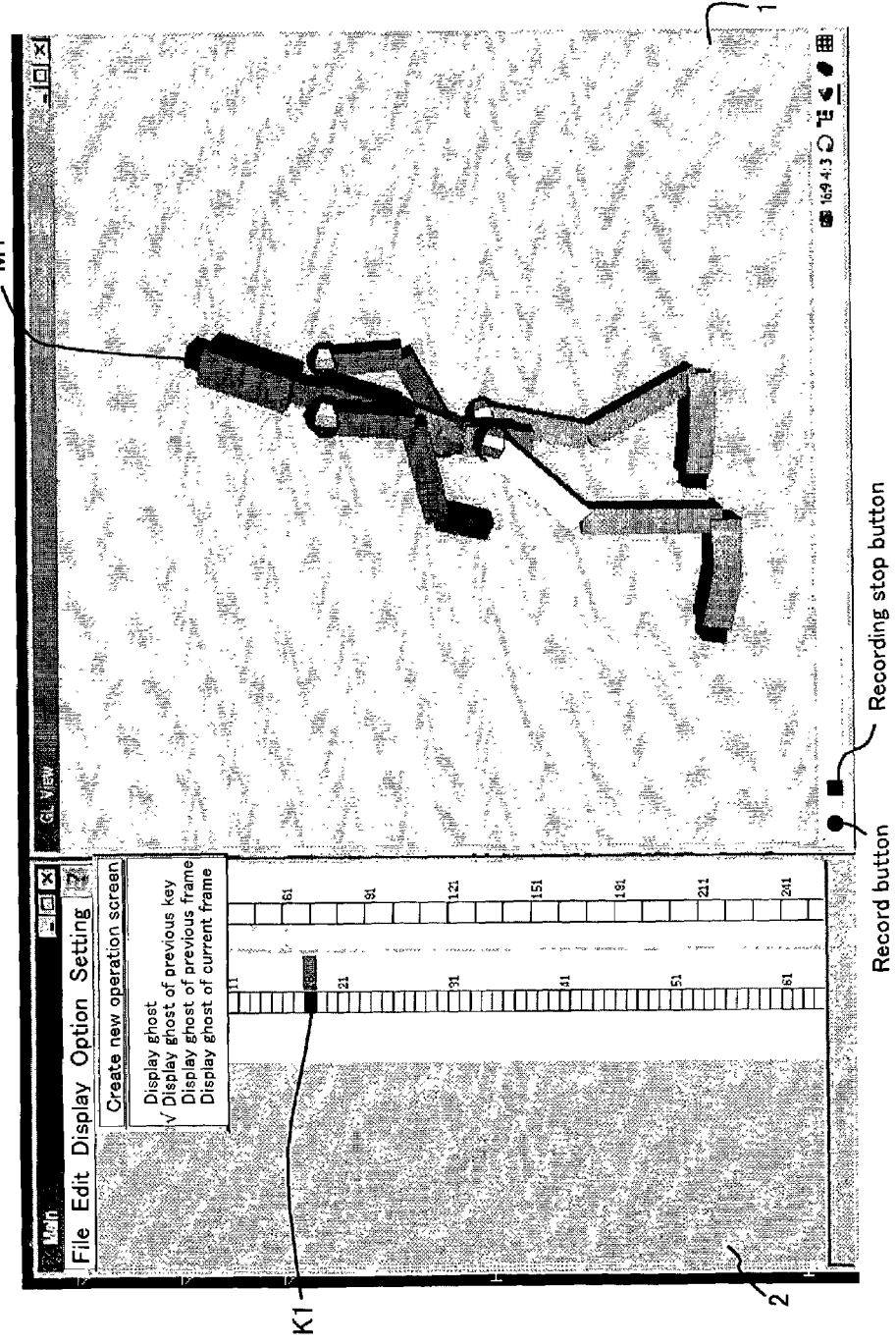
FIG. 7 serves to illustrate a ghost display of the structure.
Figure 8:
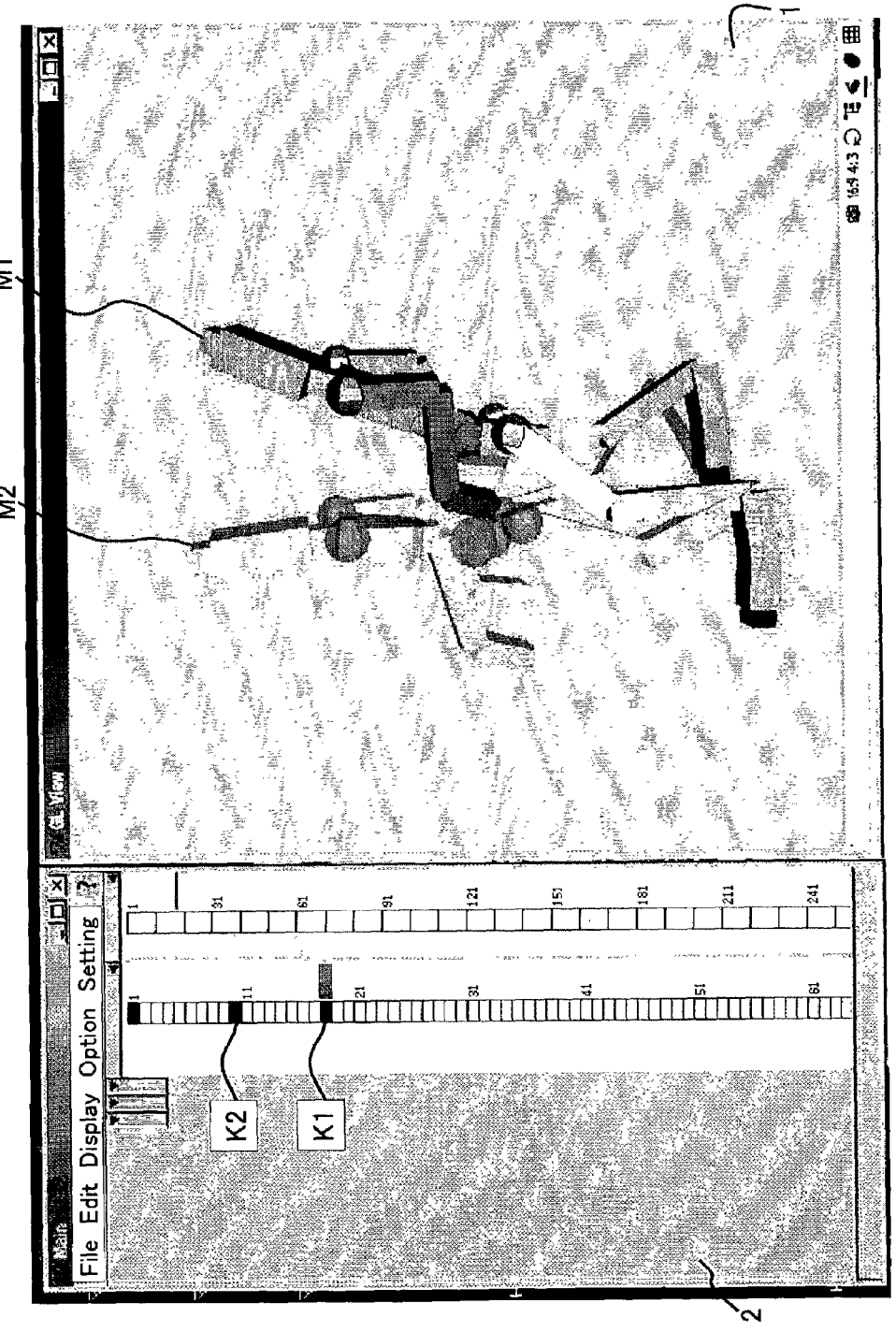
FIG. 8 serves to illustrate a ghost display of the structure.

FIGS. 7 and 8 serve to illustrate a ghost display of the structure. In the screen example of FIG. 7, an operation window 1 that displays a structure, and a time sheet window 2 that displays a time sheet are displayed. In the operation window 1, a structure M1, which corresponds to a key frame K1 of the current time on the time sheet of the time sheet window 2, is displayed. Here, when the user clicks on the display in the menu of the time sheet window 2 and selects "Display ghost of previous key", for example, in the pull-down menu thus displayed, a structure M2, which corresponds to a key frame K2 that is one frame before key frame K1, is displayed as a ghost image, as shown in the screen example of FIG. 8.

The number of structures displayed as ghost images is not limited to one, it being possible to display a plurality thereof. Further, structures displayed as ghost images are not limited to the structure of the key frame that is one frame before the current time. It is also possible to select the structure of a key frame that further precedes, of the next key frame following the current time, or of a key frame that further follows. Moreover, as displayed in the pull-down menu, not only the structures of key frames, but also the structures of the frames between the key frames (displayed as "frame" in the pull-down menu) can be displayed as ghost images.

Further, the structure of another time is not limited to a ghost display but rather can also be displayed in the operation window 1 so as to be distinguishable from the structure of the current time, and can be displayed using a different color, for example.

Figure 9:
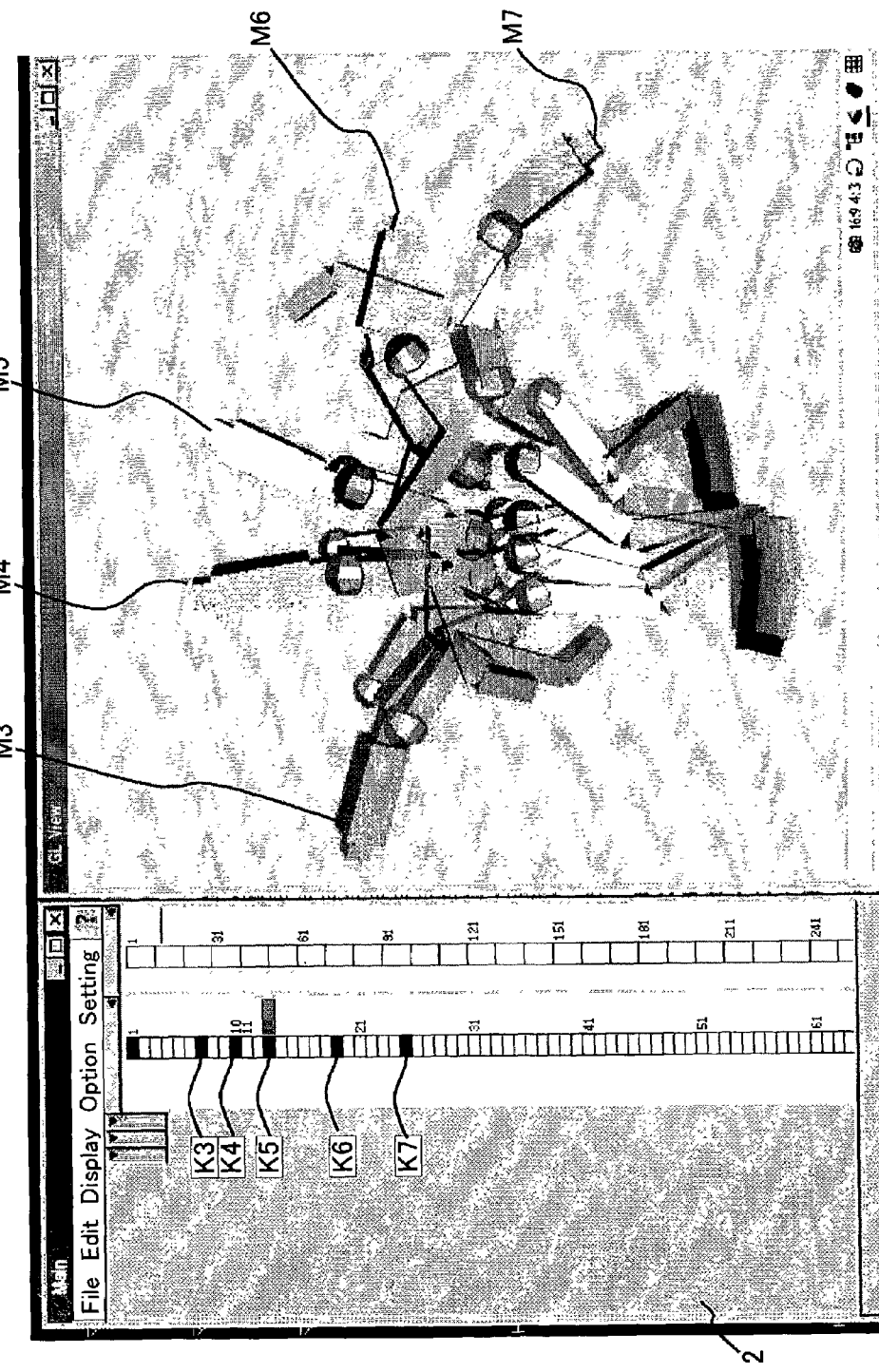
FIG. 9 is an example of a screen in which a plurality of structures are displayed as ghost images.

FIG. 9 is an example of a screen in which a plurality of structures are displayed as ghost images. A key frame K5 in the time sheet window 2 of FIG. 9 is the key frame of the current time, and, in addition to the structure M5, which corresponds to key frame K5, the structures M3, M4, M6, M7, which correspond to key frames K3, K4, K6, K7, two of which precede key frame K5 and two of which follow key frame K5, are displayed as ghost images. Also, although not illustrated in FIG. 9, when a plurality of structures are displayed as ghost images, a menu that permits the selection of a plurality of frames for a ghost display is provided.

Thus, by displaying the structure of another key frame as a ghost image in the window that displays the structure of the key frame of the current time, the user is able to create the structure of the key frame of the current time while confirming the posture and position of the structure of the key frame of another time, which permits an efficient operation.

Preferably, when selecting a structure displayed as a ghost image by aligning the cursor with the structure displayed as a ghost image in the operation window 1 and clicking the mouse, it is possible to move the key frame of the current time to the key frame that corresponds to the structure selected. For example, in FIG. 8, when the structure M2 is selected, the key frame of the current time changes from key frame K1 to key frame K2 in the time sheet window 2. Accordingly, in the operation window 1, the structure M2 changes from a ghost display to a normal display. Further, in this case, the structure of the key frame that precedes key frame K2 by one further key frame is displayed as a ghost image.

Furthermore, the animation creation program of the present embodiment may also possess a function to permit a link in the structure of the key frame of the current time to be attached to a link corresponding to a structure displayed as a ghost image. This attachment function is a useful function in cases where the user wishes to match the positions of links of structures between different key frames.

Figure 10:
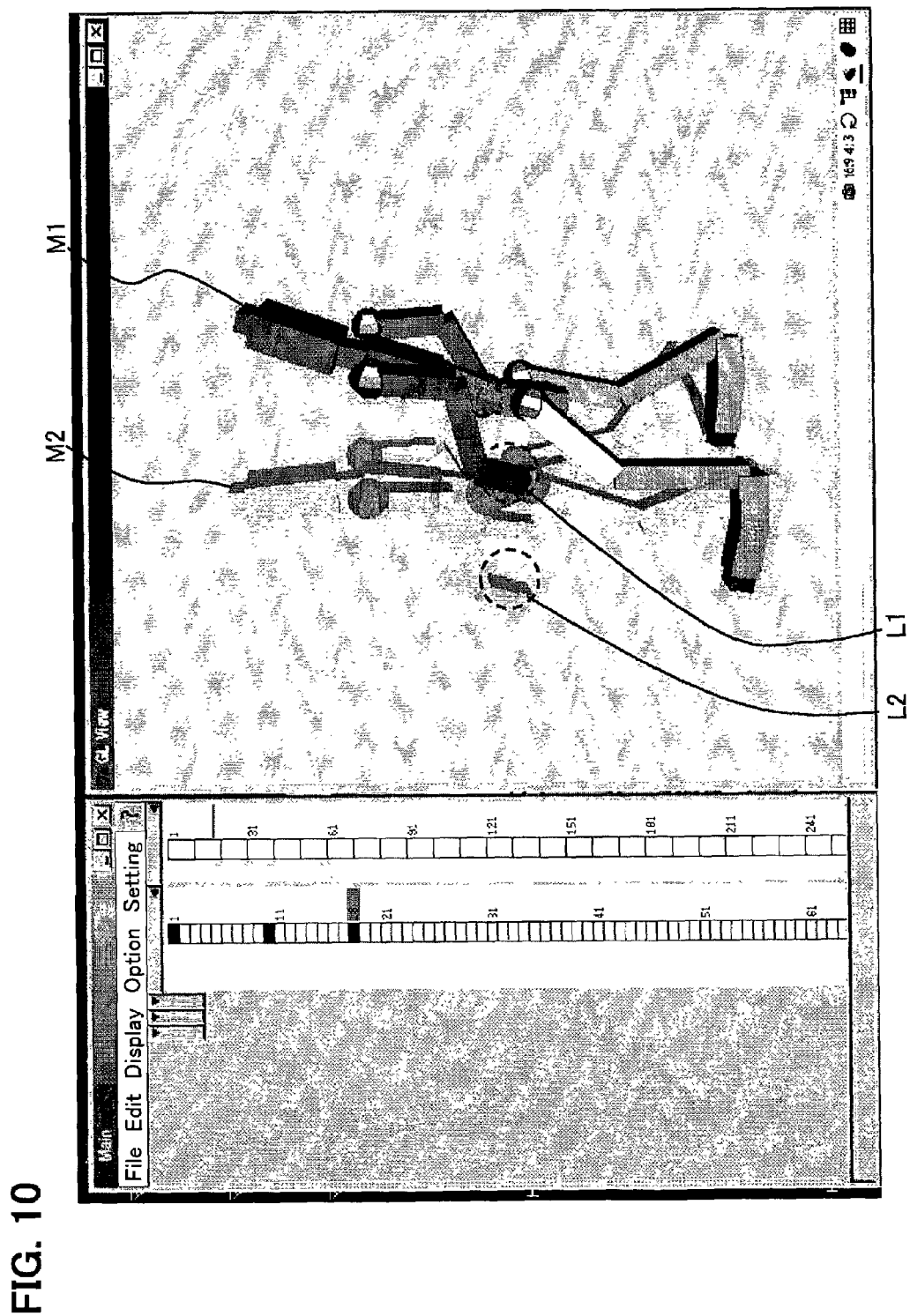
FIG. 10 serves to illustrate a function to attach a link of the structure.
Figure 11:
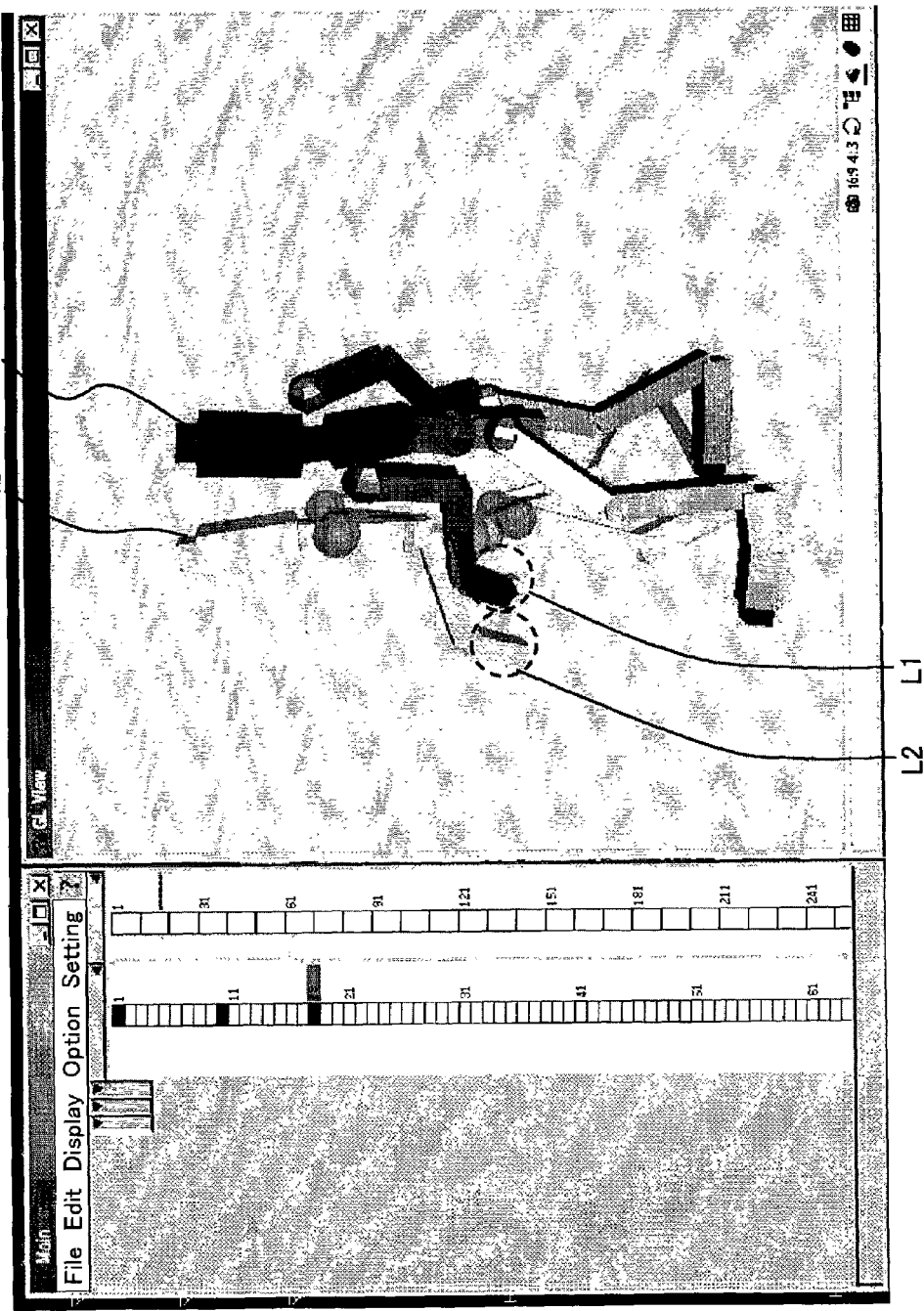
FIG. 11 serves to illustrate a function to attach a link of the structure.
Figure 12:
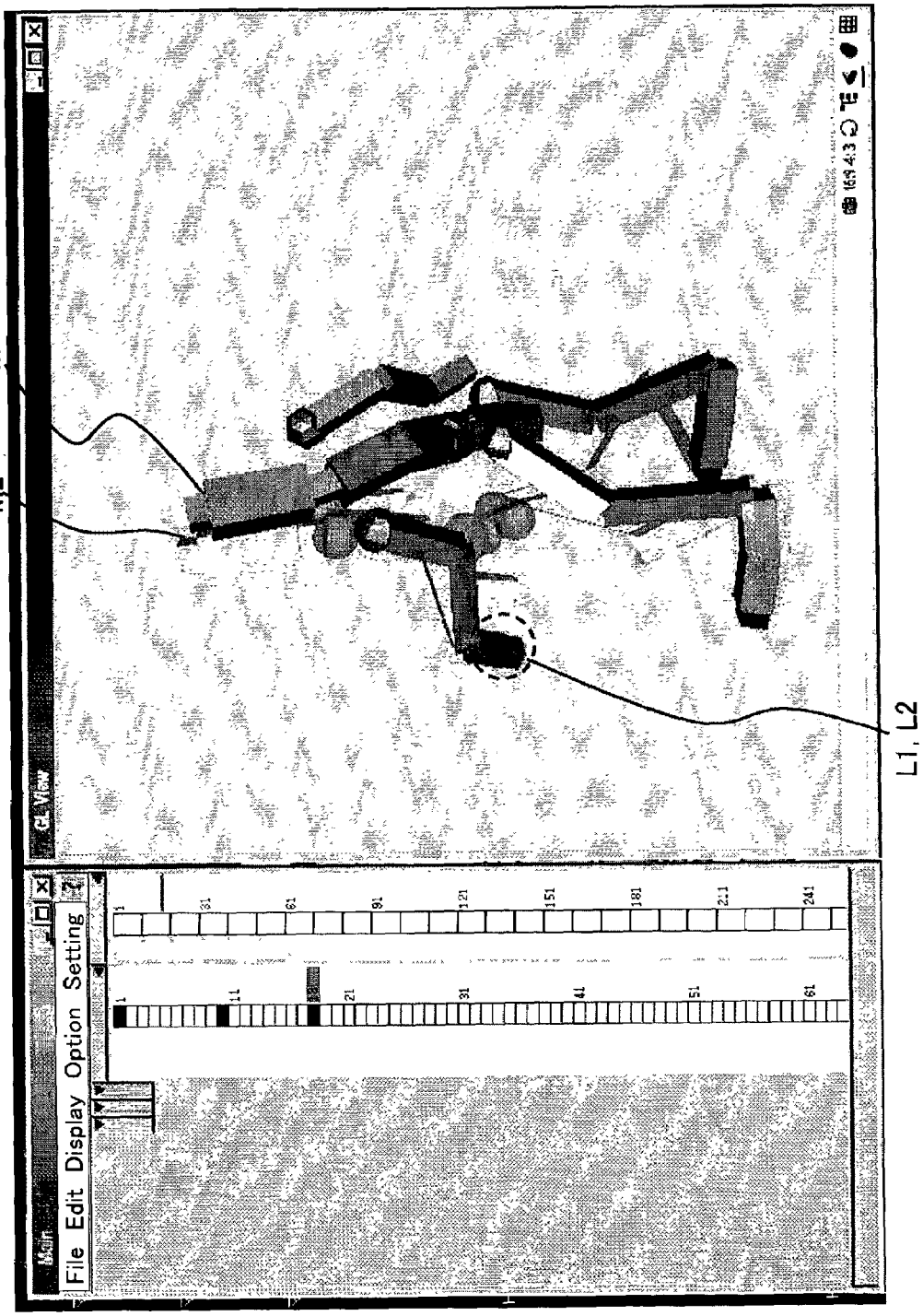
FIG. 12 serves to illustrate a function to attach a link of the structure.

FIGS. 10, 11 and 12 serve to illustrate the function to attach the links of structures. As shown in FIG. 10, when the user selects and drags a link L1 (the link which is encircled by a dotted line) in the structure Ml of the current time, for example, as shown in FIG. 11, the selected link L1 draws close to a link L2 (the link which is encircled by a dotted line) that corresponds to the structure M2 displayed as a ghost image. When the distance on the screen between link L1 and link L2 is equal to or less than a predetermined distance, the selected link L1 automatically moves to the position of the corresponding link L2 displayed as a ghost image, as shown in FIG. 12. Consequently, link L1 and link L2 are displayed on top of each another. In other words, when, in the window screen, the (three-dimensional) coordinates of a predetermined point of link L land the coordinates of a point which corresponds to link 2 are compared and the distance between the two sets of coordinates are equal to or less than a predetermined distance, link 1 is moved such that the coordinates of link L1 becomes the coordinates of link L2. At such time, the positions and posture of the other links of the structure M1 are determined so that the structure M1 retains a natural posture, on the basis of the inverse kinematics computation based on a Jacobian and the SR-Inverse.

Because the animation creation program according to the present embodiment displays a three-dimensional structure on a two-dimensional screen, when this attachment function is not present, even if the user seeks to visually overlap link L1 and link L2 and even though on the screen it would appear that two links are on top of each another, there are cases where the two links do not match each another in the depth direction of the screen. In this case, when a structure is displayed by changing the viewpoint, the two links do not overlap, and once again, an operation is required to drag link L1 so that link L1 and link L2 lie on top of one another, which is inefficient. Therefore, in the animation creation program of the present embodiment for creating a three-dimensional structure, the above-mentioned attachment function is particularly effective and makes a substantial contribution toward work efficiency in the creation of an animation by the user.

In addition, the animation creation program according to the present embodiment permits the selection of at least one frame (including key frames) by performing a predetermined selection operation with respect to a time sheet. At such time, the region of the selected frame(s) (the selection region) is displayed on the time sheet.

Figure 13:
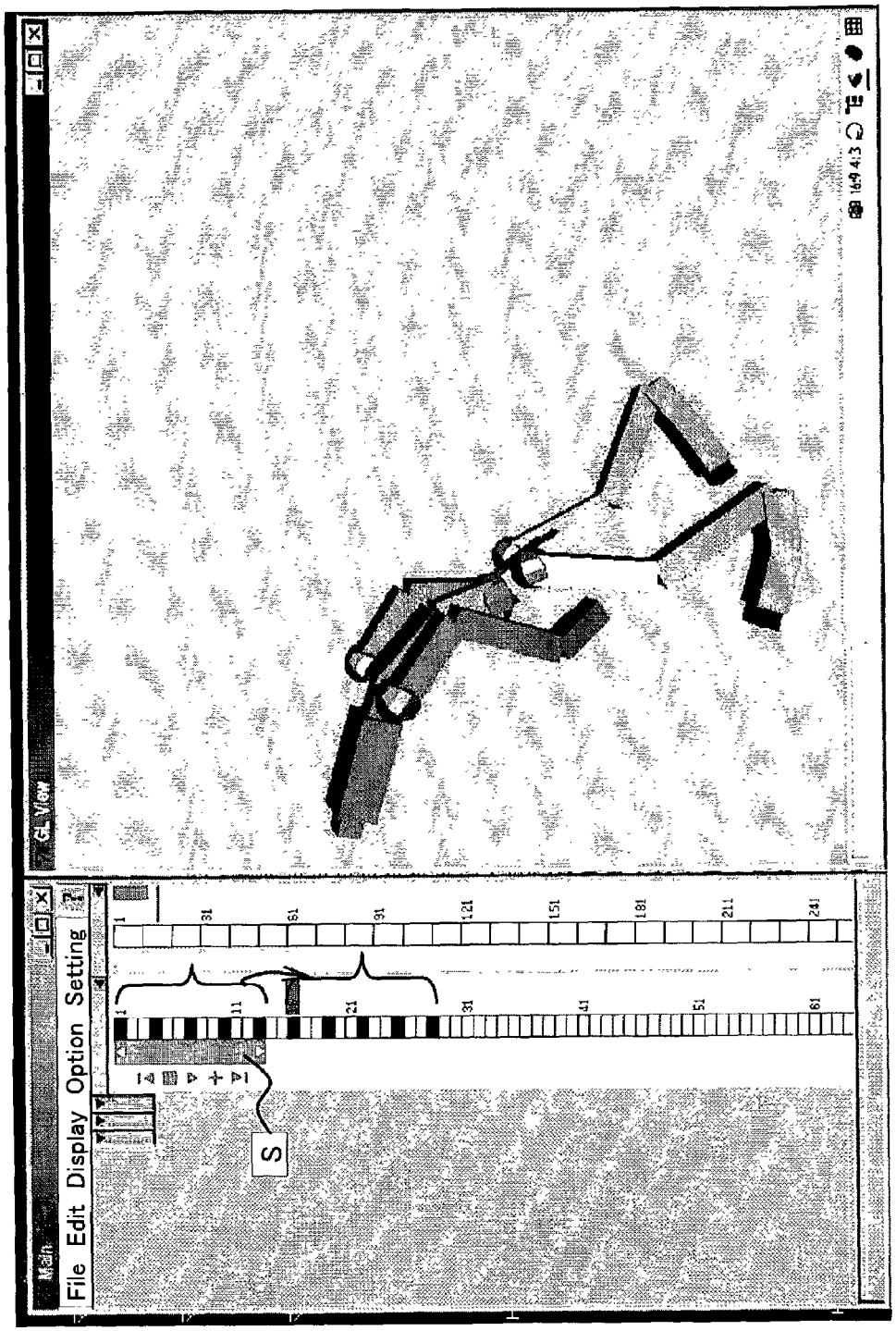
FIG. 13 shows an example of a screen in which a selection region is displayed in a time sheet window.

FIG. 13 shows an example of a screen in which a selection region is displayed in the time sheet window. In FIG. 13, a selection region S is displayed alongside the selected frames so as to follow the vertically oriented frame bar. In FIG. 13, frame numbers 1 to 13 are selected. By clicking a playback button ("[shaded upward-facing triangle]" (reverse playback) or "[shaded downward-facing triangle]" (forward playback)) displayed alongside the selection region S, the frames of the selection region S can be played back. Further, the "[shaded square]" button, which is displayed between the playback buttons "[shaded upward-facing triangle]" and "[shaded downward-facing triangle]" is a playback stop button.

Furthermore, the animation creation program according to the present embodiment makes it possible to copy the frames of the selection region S to the frames of another time interval. First, (1) although not illustrated in FIG. 13, a menu is displayed by aligning the cursor with the selection region S and right-clicking, and all of the frames of the selection region S can be copied by selecting "Copy" which is contained in this menu. Next, (2) a predetermined frame is selected (frame number 16 is selected in FIG. 13), and (3) by right-clicking and then selecting "Paste" which is contained in the menu thus displayed, the selected frame is made the start position, and the copied frames are pasted. In other words, in FIG. 13, the frames of numbers 1 to 12 are "pasted" to the frames of numbers 16 to 28. It is thus possible to easily create an animation of repetitive motion.

The animation creation program according to the present embodiment also makes it possible to create a group (frame group) for creating motion for some (at least one) of the links, separately from a frame group for creating motion for all of the plurality of links that constitute the structure. That is, in addition to a frame bar for the structure as a whole, a frame bar for the group of some of the links can be provided separately. It is thus possible to create the motion corresponding to some of the links separately from the motion for the structure as a whole. It is also possible to synthesize the motion corresponding to some of the links with the motion for the structure as a whole. This function makes it possible to cut away only a part of the structure to thereby create motion that corresponds to this part.

Figure 14:
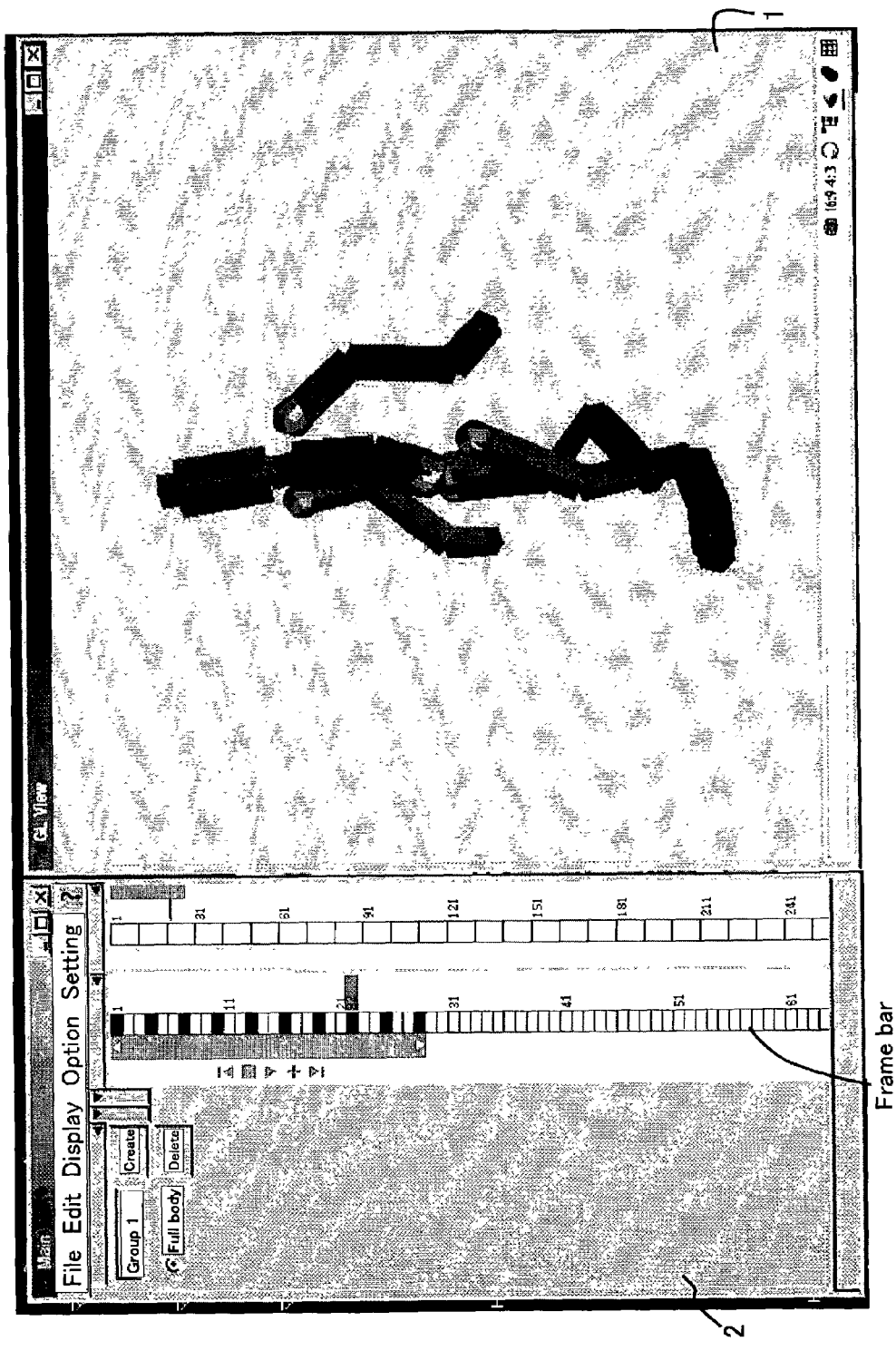
FIG. 14 provides an illustration of the creation of an animation of a group which constitutes one part of the structure.

FIGS. 14 to 18 provide an illustration of the creation of an animation of a group which constitutes one part of the structure. A frame bar for the structure as a whole is displayed in the time sheet window 2 in FIG. 14, and the structure which corresponds to the selected frame is displayed in the operation window 1. Via the screen in FIG. 14, the user is able to create the motion for the structure as a whole by selecting a predetermined key frame. In FIG. 14, the "groups" have not yet been created.

Figure 15:
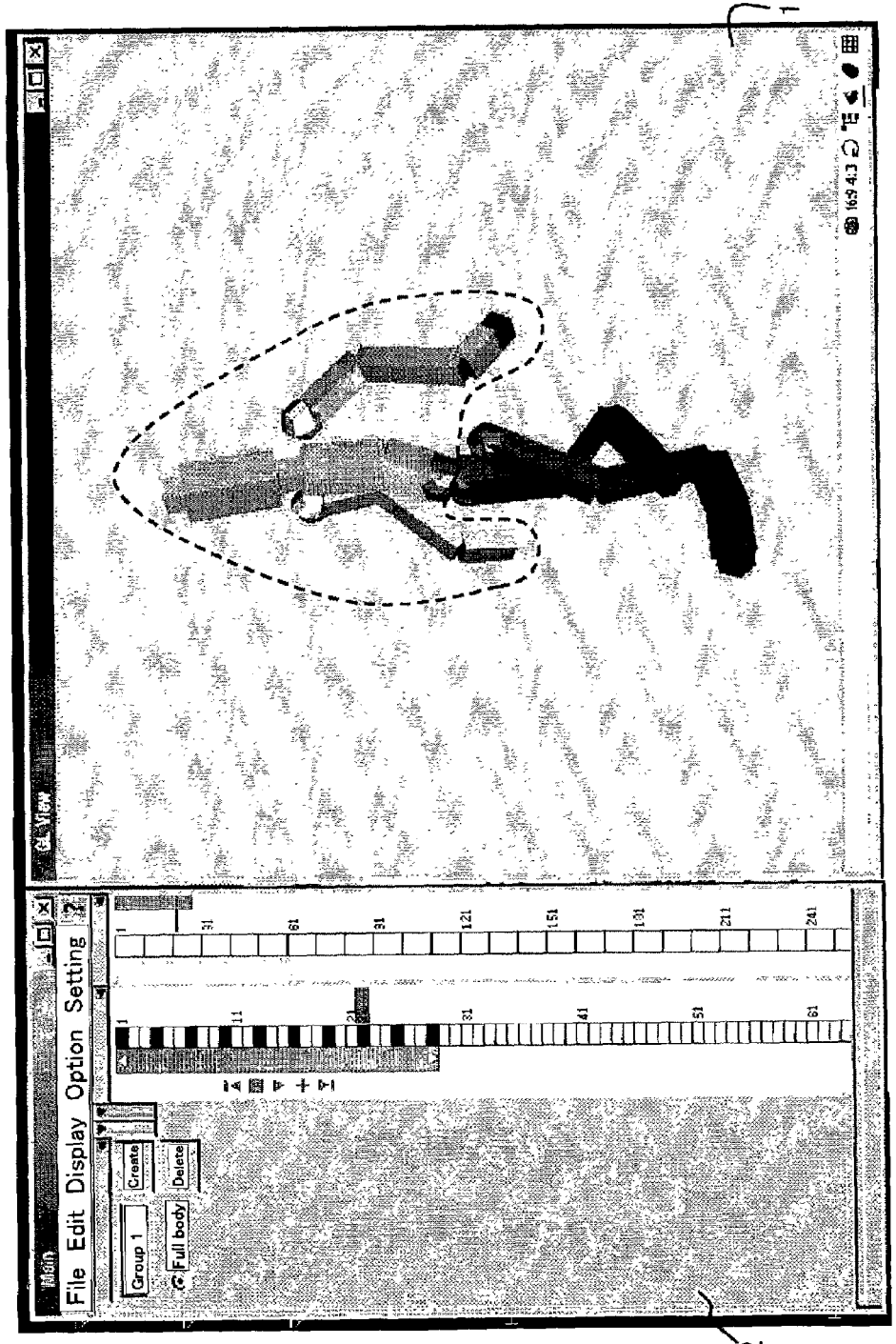
FIG. 15 provides an illustration of the creation of an animation of a group which constitutes one part of the structure.

In FIG. 15, in order to create a group, the user first selects the links which constitute the group. In FIG. 15, a plurality of links (links within the dotted line) constituting the upper half of the structure are selected (the color of the selected links changes to a color that is different from the unselected links). For example, a plurality of links can be selected by selecting links while pressing the "Shift" key on the keyboard. When the selection of links is complete, a group having the group name "group 1" is created by selecting (clicking on) the "Create" button in the time sheet window.

Figure 16:
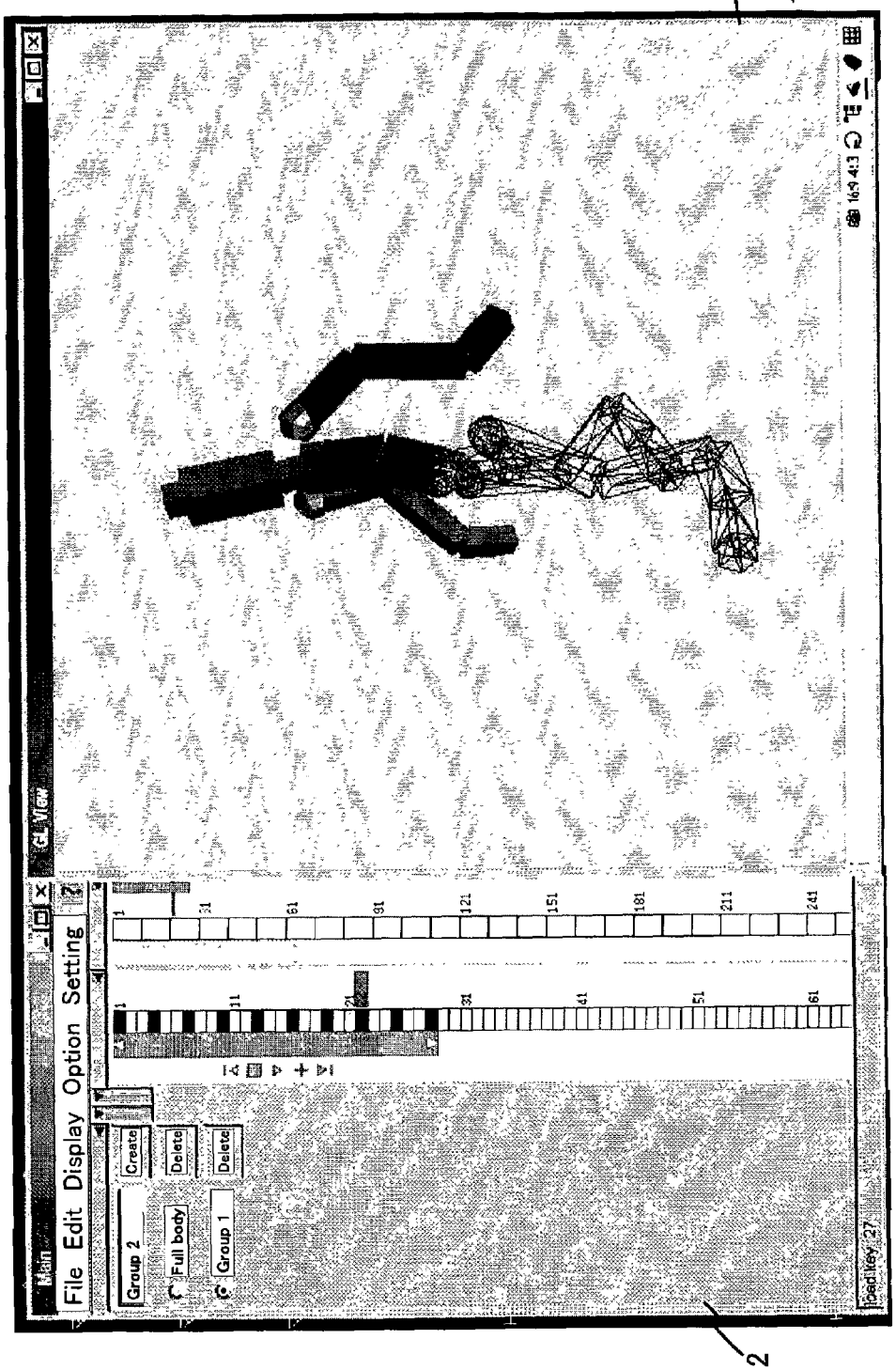
FIG. 16 provides an illustration of the creation of an animation of a group which constitutes one part of the structure.

FIG. 16 is an example of a screen after group creation, a button for switching between the structure "full body" and "group 1" being displayed in the time sheet window 2. When "group 1" is selected, some of the links, which correspond to group 1 (those links constituting the upper half of the structure) are normally displayed in the operation window 1, and, on account of not being links of group 1, the remaining links are displayed using another display method (are displayed so as to be transparent as illustrated, for example).

Figure 17:
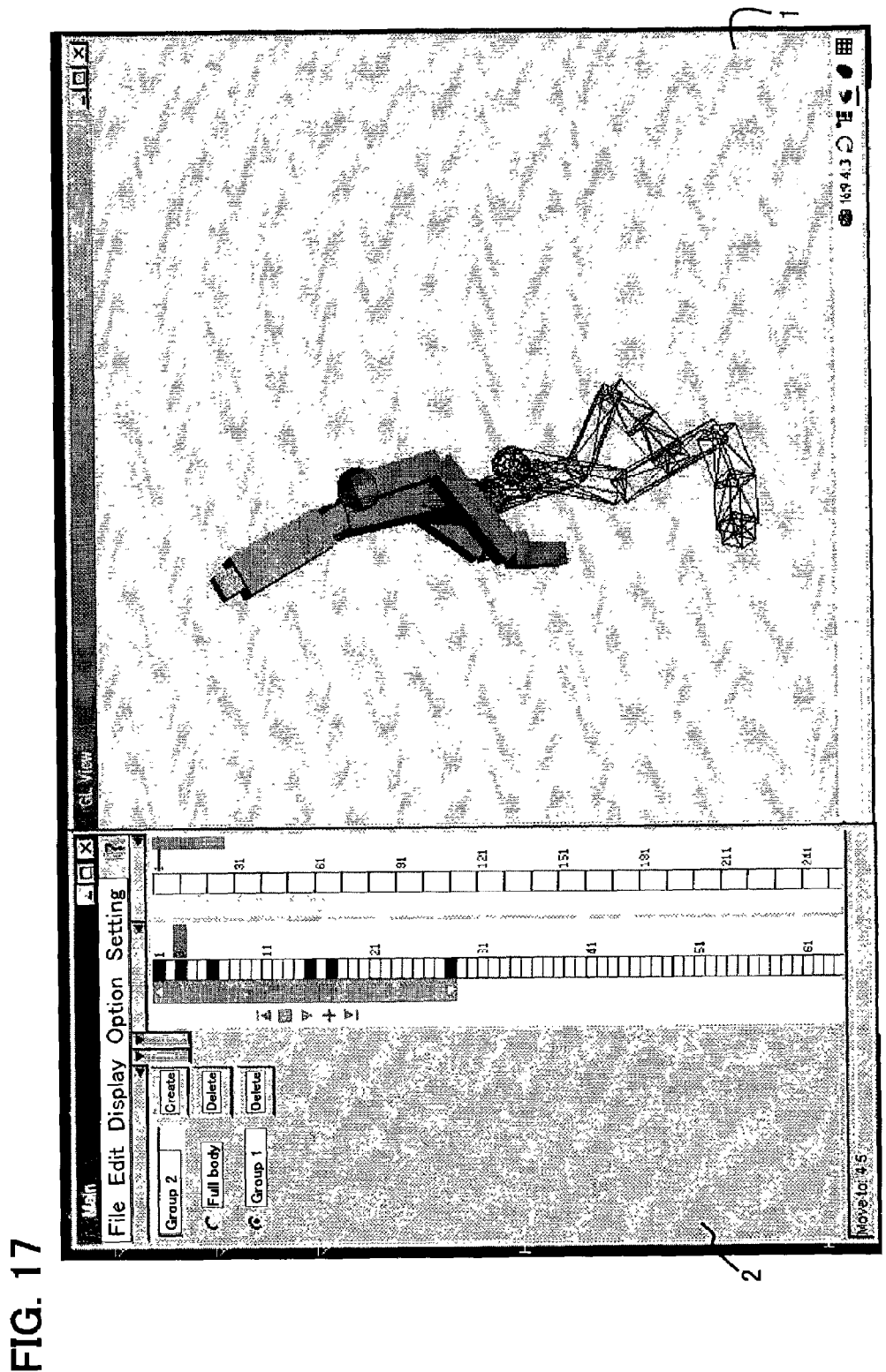
FIG. 17 provides an illustration of the creation of an animation of a group which constitutes one part of the structure.

The user is able to create motion that corresponds to group 1 separately from the motion created with respect to the structure as a whole, in the screen displaying group 1. As shown in FIG. 17, the positions of the key frames for group 1 can also differ from the positions of the key frames of the structure as a whole, such that it is possible to create the motion for group 1 independently of the motion for the structure as a whole.

Figure 18:
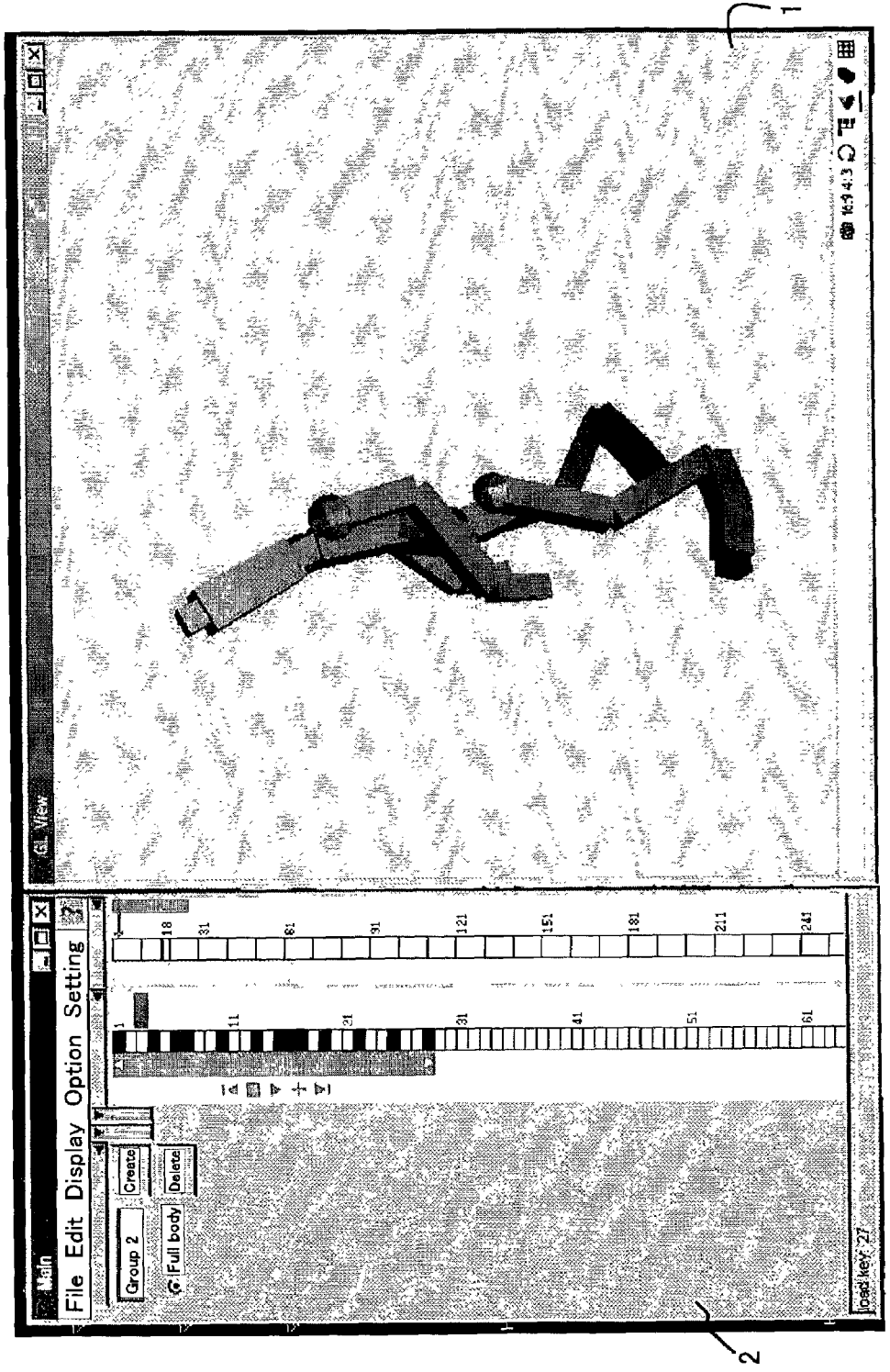
FIG. 18 provides an illustration of the creation of an animation of a group which constitutes one part of the structure.
Figure 19:
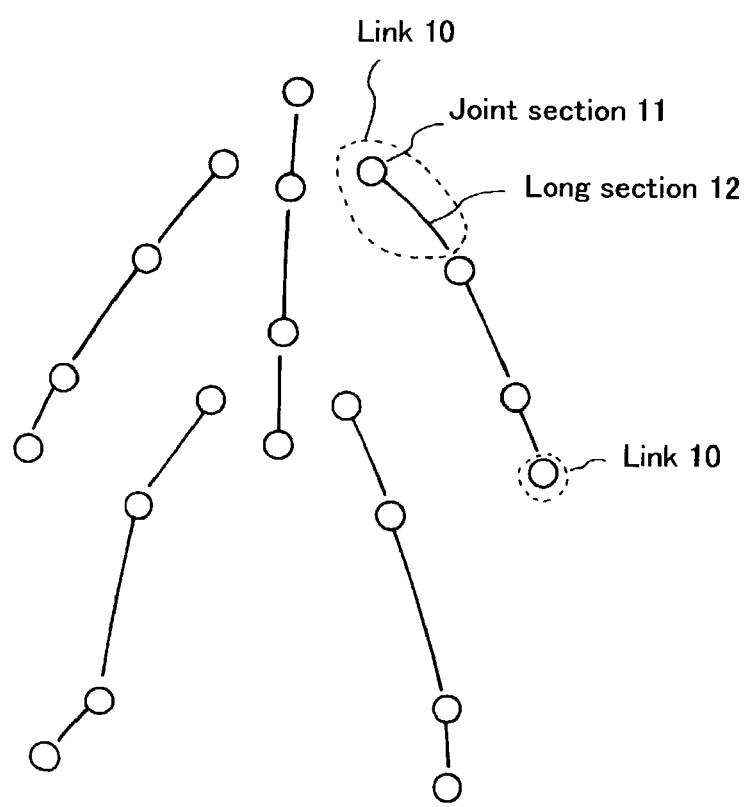
FIG. 19 shows an example of a human-type model that is constituted by a plurality of links.

It is also possible to synthesize the frames created with respect to group 1 with the frames of the structure as a whole. FIG. 18 is an example of a synthesis screen. In the time sheet window in FIG. 18, both the key frames for the structure as a whole and the key frames for group 1 are registered as key frames, such that the motion of the structure as a whole is motion generated by synthesizing both. That is, in the above example, the upper half of the structure pertains to motion corresponding to the frames created in group 1 and the lower half of the structure pertains to the unchanged motion of the frames for the structure as a whole. Frame synthesis can also be automatically performed by selecting (clicking on) the "Delete" button which corresponds to "group 1" in the time sheet window 2 in FIG. 17, for example. In other words, by deleting group 1, the frames created for group 1 are synthesized with the frames of the structure as a whole.

Further, the animation program according to the present embodiment displays a record button (the "[shaded circle]" (actually a red circle) symbol in the operation window 1 in FIG. 7) in a predetermined position in the operation window. By selecting (clicking) this record button, the user is also able to record, in a storage device (a hard disk, for example) of a computer, all operations such as the work operations by the user, that is, structure link selection and dragging operations and viewpoint switching operations, as well as the images which correspond to these operations. It is thus possible to store the work history of the user as is. Also, the "[shaded square]" button displayed adjacent to the record button "[shaded circle]" is a recording stop button.

The scope of protection of the present invention is not limited to or by the embodiments above, but rather covers the inventions appearing in the claims as well as any equivalents thereof.

INDUSTRIAL APPLICABILITY

According to the present invention hereinabove, an animation creation program is provided that makes it possible to automatically determine the positions of each link of a structure so that a structure comprising a plurality of links retains a posture that is as natural as possible. Consequently, it is possible, when moving one link of a structure that is displayed on a screen, to determine the positions of the other links of the structure so that the posture of the structure as a whole does not become unnatural, and the posture of a structure comprising a plurality of links can be determined by means of a simpler and easer operation.

The invention claimed is:

1. A computer readable medium, storing an animation creation program for displaying, on a screen of a computer, a structure comprising a plurality of links formed in a three-dimensional space by means of the computer and for creating an animation of the structure by means of the computer, wherein each link comprises at least a joint section constituting a center rotation, the animation creation program comprising:

a first step of selecting a link according to a user's operation using indicating means of the computer;

a second step of setting the spatial position of the joint section of the selected link as movable or fixed according to a user's operation using the indicating means;

a third step of determining a posture of the structure using inverse kinematics computation based on a Jacobian matrix and the Singularity-Robust Inverse (SR-Inverse) matrix thereof, responding to the user's operation using the indicating means such that a link of the structure displayed on the screen is moved;

a fourth step of creating data for displaying the structure whose posture is determined in the third step on the screen; and a fifth step of displaying the structure on the screen based on data created in the fourth step, wherein in the third step, if a solution, which is computed under the conditions that joint sections, other than the moved link, are set as moveable or fixed, can be found, said posture of the structure is determined based on the found solution, if said solution cannot be found, the link whose joint section is set as fixed is moved without setting the joint section as movable such that a solution can be found, and said posture of the structure is determined based on the solution which can be found after moving the link having a fixed joint section.

2. The computer readable medium according to claim 1, wherein the setting of the joint section of said link, which is moved such that the solution can be found, is maintained as fixed after the link is moved.

3. The computer readable medium according to claim 1, wherein even though the joint section of the link, which is moved by the user's operation in the third step, is set as fixed, the joint section is moved without setting the joint section as movable.

4. A computer readable medium, storing an animation creation program for displaying, on a screen of a computer, a structure comprising a plurality of links formed in a three-dimensional space by means of the computer and for creating an animation of the structure by means of the computer, wherein each link comprises at least a joint section constituting a center rotation, the animation creation program comprising:

a first step of selecting a link according to a user's operation using indicating means of the computer;

a second step of setting the rotational range of the joint section of the selected link according to the user's operation using the indicating means;

a third step of determining a posture of the structure using inverse kinematics computation based on a Jacobian matrix and the Singularity-Robust Inverse (SR-Inverse) matrix thereof, responding to the user's operation using the indicating means such that a link of the structure displayed on the screen is moved;

a fourth step of creating data for displaying the structure whose posture is determined in the third step on the screen; and a fifth step of displaying the structure on the screen based on data created in the fourth step, wherein in the third step, if a solution, which is computed under the condition of not rotating the joint sections of the link to exceed a set rotational range, other than the moved link, can be found, said posture of the structure is determined based on the found solution, if said solution cannot be found, the joint section, whose rotation is not to exceed the set rotation range, is rotated to exceed the set rotation range such that a solution can be found, and said posture of the structure is determined based on a solution which can be found after the rotation of the joint section.

5. The computer readable medium according to claim 4, wherein the rotational range of each link is displayed in the display position thereof on the screen.

6. The computer readable medium according to claim 5, wherein, when the rotational position of each link is at the limit of the respective rotational range thereof or is just within or just outside the limit, the display color of the rotational range displayed on the screen changes.

7. The computer readable medium according to claims 4, 5, or 6, wherein the rotational range of each link is variable according to the user's operation using the indicating means.

8. The computer readable medium according to claims 1, 2, 4, 5, or 6, wherein the link can be selected by moving indicating means, which are displayed on the screen, such that the indicating means are aligned on the screen with said link.

9. The computer readable medium according to claim 8, wherein, when said link is selected, the display color on the screen of said link changes.

* * * * *